United States Patent [19]

Liebig

[11] Patent Number: 4,500,239
[45] Date of Patent: Feb. 19, 1985

[54] INTERLOCKING TOGGLE BOLT

[76] Inventor: Heinrich Liebig, Wormser Strasse 23, D-6102 Pfungstadt, Fed. Rep. of Germany

[21] Appl. No.: 414,369

[22] PCT Filed: Mar. 23, 1982

[86] PCT No.: PCT/EP82/00061
§ 371 Date: Aug. 25, 1982
§ 102(e) Date: Aug. 25, 1982

[87] PCT Pub. No.: WO82/03664
PCT Pub. Date: Oct. 28, 1982

[30] Foreign Application Priority Data

Apr. 14, 1981 [DE] Fed. Rep. of Germany ....... 3115040

[51] Int. Cl.³ .............................................. F16B 13/04
[52] U.S. Cl. ........................................ 411/65; 411/341
[58] Field of Search ...................... 411/64, 65, 66, 340, 411/341, 342, 343, 344, 345, 346

[56] References Cited

U.S. PATENT DOCUMENTS

| 1,304,065 | 5/1919 | Kennedy | 411/64 |
| 3,296,919 | 1/1967 | Williams | 411/65 X |
| 4,245,545 | 1/1981 | Freeman | 411/342 |
| 4,290,338 | 9/1981 | Gruber | 411/65 |

FOREIGN PATENT DOCUMENTS

| 2906914 | 9/1980 | Fed. Rep. of Germany | 411/65 |
| 1327260 | 4/1963 | France | 411/65 |
| 1109570 | 4/1968 | United Kingdom | 411/64 |
| 1353559 | 5/1974 | United Kingdom | 411/65 |

Primary Examiner—Thomas J. Holko

[57] ABSTRACT

Toggle bolt (10) which can be set interlockingly in an undercut bore (12) and having locking elements disposed for pivoting on the toggle bolt front end and biased by a spring (32) for an excursion into the position of engagement with the undercut (16).

The locking elements (22) are secured against excursion by a clasping element (46) embracing them, which has the form of a plastic sleeve (48) from whose rearward end a circumferential annular flange projects radially whose outside diameter is greater than the diameter of the corresponding mounting bore (12). Upon the introduction of the toggle bolt (10) into the mounting bore (12), the annular flange (50) holds the clasping element (46) back at the outer end of the mounting bore, the locking elements (22) being pushed out of the sleeve (48) and being then able to swing out freely.

Thin tabs (42) pointing radially inward on the sleeve (48) prevent a premature pushing of the clasping element (46) away from the locking elements (22) prior to the setting process.

3 Claims, 4 Drawing Figures

INTERLOCKING TOGGLE BOLT

The invention relates to a toggle bolt which can be set interlockingly in a bore provided with a circumferential radial undercut, having a toggle body substantially corresponding to the diameter of the bore, which can be inserted into the bore, in the form of an end piece of relatively short length disposed on the bore-internal end of an elongated mounting bolt provided on its outer end with a screw head or with a nut threaded on it, the bottom piece supporting the bore-internal ends of locking elements closed together to form a thick-walled cylindrical barrel around the mounting bolt, whose extremities pointing toward the bore mouth can be turned from a position within the diameter of the bore to a position in which they project at least partially beyond the diameter of the toggle body and hook lockingly against the undercut surface of the bore, and having a component engaging between the bore mouth-facing ends of the locking elements and tapering conically toward the bore interior, which [component] forces the rearward ends of the locking elements positively outwardly upon the movement of the end piece toward the bore mouth, at least one helical spring which can be placed under bias by axial compression being disposed between the conically tapering component disposed for longitudinal displacement on the mounting bolt and the screw head or nut, as the case may be, whose bias is fixed by an annular clasping element disposed on the end portion of the locking elements pointing toward the bore mouth and having an annular section projecting on the bore-mouth side beyond the diametric dimension of the corresponding bore.

The clasping element which secures the locking elements against spreading prematurely as a result of the bias of the spring is, in the known toggle bolt thus configured (DE-OS No. 2,906,914), a thin metal ring from which a plurality of radially outwardly turned tabs project which, upon the insertion of the toggle into a corresponding bore, collide with the surface of the workpiece to be mounted or of the wall provided with the bore and, as insertion continues, draw the clasping element away from the locking element, the clasping element thus being released automatically, without special manipulations.

The invention has the object of improving the operation of this clasping element while making it less expensive to manufacture, and especially of assuring that it will slip off from the locking elements only when the toggle bolt is set, but not during transport or other halding of the toggle, when the conically tapering component would then spread the locking elements apart outside of the corresponding bore.

This object is achieved in accordance with the invention in that the clasping element is in the form of a plastic sleeve having an integral, planar circumferential annular flange projecting radially from its bore-mouth side outwardly beyond the diametric dimension of the corresponding bore, and having at least one, preferably several, integral, thin, flexible tabs projecting at uniform angular intervals radially inwardly from the bore-mouth side of the sleeve and resting on the conical section of the tapering component. The plastic sleeve thus configured can be manufactured very economically by the injection molding method, and the radially inwardly projecting tabs resting against the conical section of the tapering component forming a means of securing against unintentionally pushing the sleeve downwardly from the locking elements, or indeed in either direction, i.e., whether toward the mouth of the bore or toward the interior thereof. Not until the toggle bolt is being set and its front end has been inserted into the bore to such an extent that the radially outwardly projecting annular flange of the plastic sleeve engages the surface of the workpiece to be fastened or of the wall provided with the bore, and the toggle is then pushed with greater force further into the bore, is the sleeve pushed off of the locking elements and the tapering, conical component of the spring bends the radially inwardly pointing tabs so that then the toggle can be pushed all the way into the bore until the washer, which as a rule is disposed under the screw head or under the nut of the mounting bolt lie against the outer surface of the annular flange of the plastic sleeve. The release of the locking elements thus takes place only within the bore, that is, when the rearward edges of the locking elements emerge from the bore interior-facing end of the plastic sleeve inserted into the bore until its annular flange engages the surface of the ground or workpiece, as the case may be. Premature opening of the locking elements outside of the bore is therefore prevented.

The cylindrical portion of the plastic sleeve adjoining the annular flange is within the bore of the workpiece or wall and centers the outer end of the toggle bolt, which, in the case of a shear load, prevents premature lateral displacement. At the same time it can assume a certain shock absorbing function; also, the plastic sleeve is desirable in the mounting of workpieces of a metal having an electrical potential different from that of the metal of the parts of the toggle, i.e., steel or steel alloys as a rule, because the formation of local [galvanic]cells and electrochemical corrosion resulting therefrom is prevented. On account of the pressure which is exercised on the marginal flange of the clasping element when the nut of screw head is tightened against the marginal flange of the clasping element, a seal furthermore is produced between the washer and the article being mounted or between the washer and the mounting wall, as the case may be.

The invention will be further explained in the description that follows of an embodiment in conjunction with the drawing, wherein:

FIG. 1 is a cross section through a portion of a wall having an undercut bore with a toggle bolt of the invention represented partially in longitudinal central cross section, in the still unlocked state immediately before its locking elements are swung by the tension of the spring to the position of engagement with the undercut surface, the locking position of the locking elements being indicated in broken lines;

Figure 1:
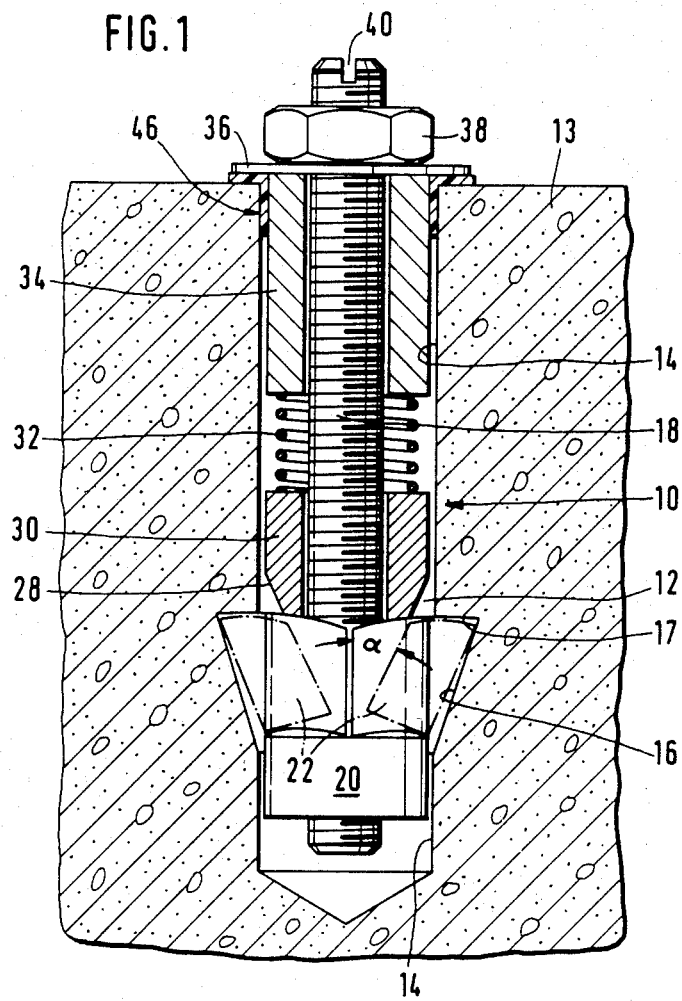
Figure 2:
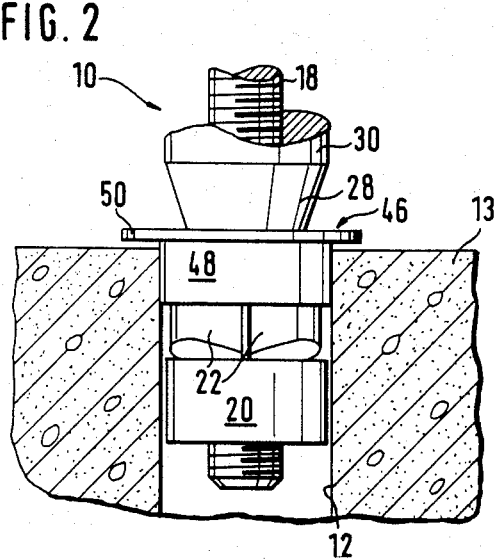
FIG. 2 is a partial cross sectional view of the front end of the toggle bolt shown in FIG. 1, at the beginning of its insertion into a corresponding bore.

The toggle of the invention, indicated in its entirety by 10 and shown in FIG. 1 and, partially, in FIG. 2, is to be set, i.e., locked, in an interlocking manner in a bore 12 in a ground 13, e.g., a concrete wall, consisting of a cylindrical pilot hole 14 and an expansion bore 16 provided at a distance from the mouth of the bore and having an undercut surface 17 facing rearwardly towards the bore mouth [sic]. The toggle 10 has an elongated mounting bolt 18 on whose bore-internal end an end piece 20 that is only slightly smaller in diameter than the diameter of the pilot bore 14. The mounting bolt 18 is therefore able to be screwed into and out of the end piece by rotating it. On the rearward end face of the end piece, i.e., the end facing the bore mouth, three locking elements 22 are supported, which are distributed at uniform angular distances about the mounting bolt, and, taken together, they have the form of a thick-walled barrel which, however, is divided into three locking elements 22 by three axial cuts running longitudinally.

The thickness of the locking elements 22 is such that the barrel which they form in their position for insertion is slightly smaller in diameter than the bore, i.e., its diameter corresponds approximately to the diameter of the end piece 20. Following the locking elements 22 a sleeve-like component 30, which tapers conically toward the interior of the bore and whose tapered end 28 engages between the locking elements 22, is disposed for longitudinal displacement on the mounting bolt 18. On the rearward end surface of the sleeve 30 there is disposed a helical spring 32 biased by axial compression, whose extremity at the bore mouth end abuts against an additional sleeve 34 which again is disposed for longitudinal displacement on the mounting bolt 18. The outer end of the sleeve 34 is supported via an interposed washer 36 on a nut 38 threaded onto the mounting bolt, and with a screwdriver inserted in a screwdriver slot 40 provided on the outer end surface of the mounting bolt it is possible to prevent the mounting bolt from turning when the nut 38 is tightened or loosened. The washer 42 provided between the nut 38 and the sleeve 34 transmits the tightening force produced by the tightening of the nut 38 after the locking elements 22 have locked against the undercut surface 17 on the surface of a workpiece that is to be mounted.

Instead of the nut 38, a screw head can be cut on the end of the mounting bolt 18, and when it is turned the mounting bolt 18 is screwed into the end piece 20.

Figure 3:
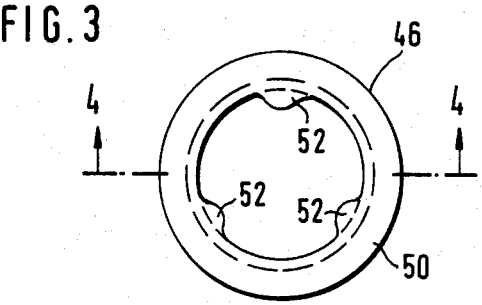
FIG. 3 is a top view of the plastic sleeve holding the locking elements of the toggle bolt of the invention against accidental turning to the locking position.
Figure 4:
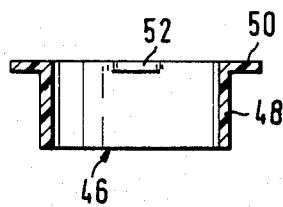
FIG. 4 is a cross sectional view seen in the direction of the arrows 4—4 in FIG. 3.

The swinging of the locking elements 22 to the locking position, indicated in broken lines in FIG. 1, by the tapered section 28 of component 30 which is forced between the locking elements by the bias of the spring 32, is prevented by the clasping element 46 represented separately in FIGS. 3 and 4, in the form of a plastic sleeve 48 which when the toggle 10 is assembled is slipped over the bore mouth ends of the retracted locking elements. A circumferential, planar annular flange 50 projecting radially outwardly beyond the diameter dimension of a corresponding bore 12 and formed integrally on the bore mouth end of the sleeve 48 strips the clasping element 46 away from the locking elements upon introduction into the bore, so that, upon the further axial insertion of the toggle, the locking elements automatically are turned to the locking position after their rearward ends have passed the undercut surface 17.

The clasping element 46 then remains at the bore-mouth end of the toggle bolt, the annular flange 50 lying upon the surface of the ground 13 or of a workpiece held by the toggle bolt, while the plastic sleeve 48 centers the outer end of the toggle bolt in the bore 12.

To prevent the clasping element 46 from being accidentally stripped from the locking element before the toggle bolt 10 is set in a bore 12, three radially inwardly projecting, thin tabs 52 (FIGS. 3 and 4) are additionally provided at the bore-mouth end of the sleeve 48, and overlap the end faces of the locking elements facing rearwardly toward the bore mouth, while their free ends rest on the tapered section 28 of component 30. In the normal manipulation of the toggle bolt, the resistance of the tabs 52 to bending over suffices to prevent accidental stripping of the clasping element 46 from the locking elements 22. If, however, during the installation of the toggle bolt, after the annular flange 50 has come in contact with the surface of the ground or workpiece, an increased axial pressure is exerted momentarily in the direction of insertion, the tabs 52 are bent increasingly backwards by the conical section 28, until they contact the inside surface of the sleeve 48 and then the component 30 as well as the spring 32 and the sleeve 34 can be pushed through the sleeve.

It is apparent that modifications and developments of the above-described embodiment can be made within the scope of the invention. Such modifications can relate, for example, to the number and shape of the tabs 52 of the clasping element 46 shown in the drawing and described above. Instead of the three tabs 52 described, a larger or smaller number of bendable tabs can be provided. In the most extreme case, even a single tab can suffice, while on the other hand it is also imaginable that a single circumferential, film-thin annular flange narrowing the mouth of the sleeve 48 can be provided, which will be broken open radially by the axial pressure exercised in the setting of the toggle bolt. Also fins provided on the inside surface of the circumferential wall of the plastic sleeve can prevent unintentional displacement of the clasping element.

I claim:

1. A toggle bolt to be set interlockingly in a bore provided with a radially circumferential undercut surface; said toggle bolt comprising a toggle body having a diameter corresponding substantially to the diameter of the bore and adapted to be inserted into the bore, an elongated mounting bolt having a bore internal end and an outer end, said body being in the form of an end piece of relatively short length disposed on the bore-internal end of said elongated mounting bolt; said mounting bolt having on said outer end a screw head or threaded-on nut, locking elements having internal ends seated on said mounting bolt and closed together to form a thick-walled cylindrical barrel around said mounting bolt, said locking elements also having ends which point toward the bore mouth and which are swingable from a position lying within the diameter of the bore to a position in which said ends project at least partially beyond the diameter of the toggle body and lockingly hook the undercut surface of the bore, a component having a conical section tapering toward the bore interior and engaging between the locking element ends pointing toward the bore mouth, said component upon a displacement of the end piece in the direction of the bore mouth positively turning the rearward ends of the locking elements outwardly, at least one sleeve displaceable in the bolt length direction and one helical spring adapted to be biased by axial compression being disposed between the conically tapering component disposed for longitudinal displacement on the mounting bolt and the screw head or nut, an annular clasping element for fixing the bias of the spring being disposed on the ends of the locking elements which point toward the bore mouth, and having an annular section projecting on the bore mouth side beyond the diametric dimension of the corresponding bore, the clasping element being a plastic sleeve having a planar circumferential annular flange projecting integrally from the bore-mouth side end of said sleeve radially outwardly beyond the diametric dimension of the bore and also having at least one relatively thin, bendable tab projecting integrally from a bore-mouth side end edge of said plastic sleeve radially inwardly in the same plane as said annular flange and located on the bore-mouth side in front of at least one locking element respectively and, at the time of introduction of the toggle bolt into the bore, resting on the conical section of said tapering component, to thereby prevent displacement of said clasping element from said locking elements by engagement of said at least one tab on said conical section.

2. A toggle bolt according to claim 1, wherein said clasping element has a plurality of tabs arranged at uniform angular intervals.

3. A toggle bolt according to claim 2, wherein the number of radially inwardly projecting bendable tabs corresponds to the number of locking elements.

* * * * *